United States Patent
Krelbaum et al.

(10) Patent No.: US 9,529,678 B2
(45) Date of Patent: Dec. 27, 2016

(54) APPARATUS AND METHOD FOR MONITORING AND AUDITING ACTIVITY OF A LEGACY ENVIRONMENT

(71) Applicant: INTELLINX LTD., Or Yehuda (IL)

(72) Inventors: Boaz Krelbaum, Ganei-Tiqva (IL); Orna Mintz-Dov, Ramat Efal (IL)

(73) Assignee: Intellinx, Ltd., Or Yehuda (IL)

( * ) Notice: Subject to any disclaimer, the term of this patent is extended or adjusted under 35 U.S.C. 154(b) by 844 days.

(21) Appl. No.: 13/849,042

(22) Filed: Mar. 22, 2013

(65) Prior Publication Data

US 2013/0282664 A1 Oct. 24, 2013

Related U.S. Application Data

(63) Continuation of application No. 12/888,088, filed on Sep. 22, 2010, now Pat. No. 8,433,791, which is a (Continued)

(51) Int. Cl.
*G06F 11/30* (2006.01)
*G06F 11/14* (2006.01)
(Continued)

(52) U.S. Cl.
CPC ......... *G06F 11/1464* (2013.01); *H04L 43/065* (2013.01); *H04L 63/12* (2013.01);
(Continued)

(58) Field of Classification Search
CPC ...... H04L 63/12; H04L 67/125; H04L 43/065; H04L 43/026; H04L 43/16; H04L 43/18; G06F 11/1464
(Continued)

(56) References Cited

U.S. PATENT DOCUMENTS

| 4,575,793 A | 3/1986 | Morel et al. |
| 5,228,122 A | 7/1993 | Cahn et al. |

(Continued)

FOREIGN PATENT DOCUMENTS

| EP | 1 211 865 A2 | 6/2002 |
| WO | 01/25914 A2 | 4/2001 |

(Continued)

OTHER PUBLICATIONS

Postel et al.; "Telnet Protocol Specification" RFC 854; entered into the case on Apr. 18, 2013.
(Continued)

*Primary Examiner* — Kenneth R Coulter
(74) *Attorney, Agent, or Firm* — Renner, Otto, Boisselle and Sklar LLP

(57) ABSTRACT

An apparatus and a method for monitoring and auditing activity of a legacy environment. The apparatus includes an analyzer and a mirror manager. The analyzer is operative to analyze intercepted packets conveyed by entities in a network and to generate analyzed data based on information associated with at least some of the packets. The analyzed data is indicative of sessions. The mirror manager is responsive to the analyzed data for generating data representative of mirror sessions, each mirror session corresponding to a session.

7 Claims, 12 Drawing Sheets

Related U.S. Application Data continuation of application No. 10/585,452, filed as application No. PCT/IL2005/000027 on Jan. 9, 2005, now Pat. No. 7,831,703.

(60) Provisional application No. 60/534,404, filed on Jan. 7, 2004.

(51) Int. Cl.
  *H04L 29/06* (2006.01)
  *H04L 29/08* (2006.01)
  *H04L 12/26* (2006.01)

(52) U.S. Cl.
  CPC .......... *H04L 67/125* (2013.01); *H04L 43/026* (2013.01); *H04L 43/16* (2013.01); *H04L 43/18* (2013.01)

(58) Field of Classification Search
  USPC .......... 709/224, 223, 227–229, 231; 715/740
  See application file for complete search history.

(56) References Cited

U.S. PATENT DOCUMENTS

| | | | |
|---|---|---|---|
| 5,634,008 A | 5/1997 | Gaffaney et al. | |
| 5,644,717 A | 7/1997 | Clark | |
| 5,790,798 A | 8/1998 | Beckett, II et al. | |
| 5,912,669 A | 6/1999 | Hsia | |
| 5,961,592 A | 10/1999 | Hsia | |
| 6,044,401 A | 3/2000 | Harvey | |
| 6,192,411 B1 | 2/2001 | Chan et al. | |
| 6,205,416 B1 | 3/2001 | Butts et al. | |
| 6,651,099 B1 | 11/2003 | Dietz et al. | |
| 7,415,509 B1 | 8/2008 | Kaltenmark et al. | |
| 7,730,521 B1 | 6/2010 | Thesayi et al. | |
| 7,831,703 B2 * | 11/2010 | Krelbaum | H04L 63/12 709/224 |
| 8,433,791 B2 * | 4/2013 | Krelbaum | H04L 63/12 709/203 |
| 2002/0019945 A1 | 2/2002 | Houston et al. | |
| 2002/0065938 A1 * | 5/2002 | Jungck | H04L 47/10 709/246 |
| 2002/0163934 A1 | 11/2002 | Moore et al. | |
| 2003/0110394 A1 | 6/2003 | Sharp et al. | |
| 2003/0135612 A1 | 7/2003 | Huntington et al. | |
| 2004/0186882 A1 | 9/2004 | Ting | |
| 2005/0081158 A1 | 4/2005 | Hwang | |
| 2005/0177483 A1 | 8/2005 | Napier et al. | |
| 2006/0212270 A1 | 9/2006 | Shiu et al. | |

FOREIGN PATENT DOCUMENTS

| | | |
|---|---|---|
| WO | 02/087124 A1 | 10/2002 |
| WO | 02/100039 A2 | 12/2002 |
| WO | 03/073724 A2 | 9/2003 |

OTHER PUBLICATIONS

"The Telnet Protocol" Microsoft Knowledgebase; entered into the case on Apr. 18, 2013.

* cited by examiner

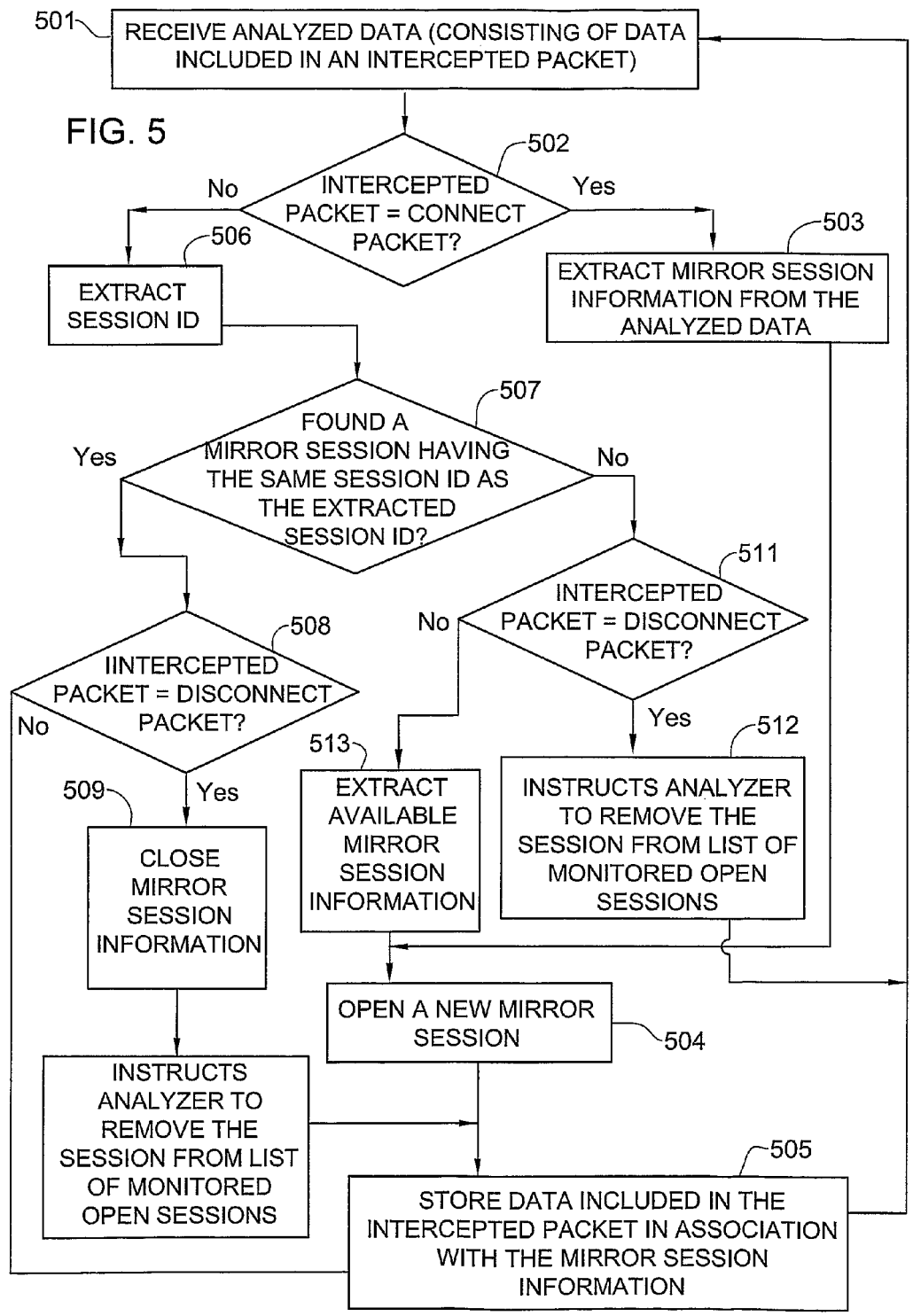

```
6C01
01 C3 11 40 | 40 1D F0 11 | C1 5B 40 D5 | C5 E6 40 C3   .C.  .0.A$ NEW C
E4 E2 E3 D6 | D4 C5 D9 40 | C9 D5 C6 D6 | D9 D4 C1 E3   USTOMER INFORMAT
C9 D6 D5 11 | C3 F1 40 C3 | E4 E2 E3 D6 | D4 C5 D9 40   ION.C1 CUSTOMER
D5 C1 D4 C5 | 7A 40 40 40 | 40 1D 40 11 | C4 D8 00 1D   NAME:        .DQ..
F0 11 C5 C1 | 40 C3 E4 E2 | E3 D6 D4 C5 | D9 40 C9 C4   0.EA CUSTOMER ID
7A 11 C5 D3 | 40 1D 50 11 | C5 5A 00 1D | F0 11 C6 D1   :.EL .&.E!..0.FJ
40 C3 E4 E2 | E3 D6 D4 C5 | D9 40 C1 C4 | C4 D9 C5 E2   CUSTOMER ADDRES
E2 7A 40 1D | 40 11 C7 C2 | 00 1D F0 11 | 40 40 40 11   S:  .GB..0.   .
C4 C4 13 FF | EF                                        DD...
```

FIG. 6C

```
6D01
7D C6 7B 11 | C4 C4 D1 D6 | C8 D5 40 C4 | D6 C5 11 C5   'F#.DDJOHN DOE.E
D4 F1 F2 F3 | F4 F5 F6 11 | C6 E4 E3 D9 | E4 D4 D7 C5   M123456.FUTRUMPE
E3 40 F2 F2 | 40 C2 C1 D5 | C6 C6 40 40 | 40 40 40 40   T 22 BANFF
40 FF EF                                                ..
```

FIG. 6D

| | | | | |
|---|---|---|---|---|
| 01 C3 11 40 | 40 1D F0 11 | C1 5B 40 D5 | C5 E6 40 C3 | .C.  .0.A$ NEW C |
| E4 E2 E3 D6 | D4 C5 D9 40 | C9 D5 C6 D6 | D9 D4 C1 E3 | USTOMER INFORMAT |
| C9 D6 D5 11 | C3 F1 40 C3 | E4 E2 E3 D6 | D4 C5 D9 40 | ION.C1 CUSTOMER |
| D5 C1 D4 C5 | 7A 40 40 40 | 40 1D 40 D1 | D6 C8 D5 40 | NAME:   . JOHN |
| C4 D6 C5 11 | C4 D8 00 1D | F0 11 C5 C1 | 40 C3 E4 E2 | DOE.DQ..0.EA CUS |
| E3 D6 D4 C5 | D9 40 C9 C4 | 7A 11 C5 D3 | 40 1D 50 F1 | TOMER ID:.EL .&1 |
| F2 F3 F4 F5 | F6 1D F0 11 | C6 D1 40 C3 | E4 E2 E3 D6 | 23456.0.FJ CUSTO |
| D4 C5 D9 40 | C1 C4 C4 D9 | C5 E2 E2 7A | 40 1D 40 E3 | MER ADDRESS: . T |
| D9 E4 D4 D7 | C5 D3 C4 D6 | D9 40 F2 F2 | 40 D2 C6 C1 | RUMPET 22 BANFF |
| 40 40 40 40 | 40 40 11 C7 | C2 00 1D F0 | 11 40 40 40 | .GB..0. |
| 11 C4 C4 13 | FF EF | | | .DD... |

APPARATUS AND METHOD FOR MONITORING AND AUDITING ACTIVITY OF A LEGACY ENVIRONMENT

This is a Continuation application of U.S. patent application Ser. No. 12/888,088, filed Sep. 22, 2010, now U.S. Pat. No. 8,433,791, which was a Continuation application of U.S. patent application Ser. No. 10/585,452, filed Jul. 7, 2006, now U.S. Pat. No. 7,831,703, which was a National Phase application filed under 35 U.S.C. 371 of PCT/IL2005/000027, filed Jan. 9, 2005, an application claiming the benefit under 35 USC 119(e) U.S. Provisional Application No. 60/534,404, filed Jan. 7, 2004, the contents of each of which are hereby incorporated by reference in its entirety.

FIELD OF THE INVENTION

This invention relates to monitoring and auditing the activity of a legacy environment.

BACKGROUND OF THE INVENTION

U.S. Pat. No. 6,192,411 ("Mapping SNA session flow control to TCP flow control", published 2001) discloses a TN3270 server that forwards a 3270 data stream from a System Network Architecture (SNA) connection to a Transmission Control Protocol (TCP) connection monitors the TCP connection for segments that acknowledge thereby-transmitted bytes. The TN3270 server also keeps track of the unacknowledged-byte window sizes specified by received TCP-connection-segments. It responds with a pacing response to a pacing-request-containing SNA message only when forwarding of previously received information from the SNA can be completed without resulting in a number of unacknowledged bytes that exceeds the specified window size.

U.S. Pat. No. 4,575,793 ("Personal-computer to 3270 system interfacing apparatus", published 1986) discloses an apparatus for interfacing a personal-computer to a 3274/6 compatible cluster controller of a 3270 type system, the apparatus employing a special high-speed processor.

WO 03/073,724 ("System and method for detecting and eliminating IP spoofing in a data transmission network", published 2004) and US 2003/110394 ("System and method for detecting and eliminating IP spoofing in a data transmission network", published 2003) disclose a traffic management system that sniffs data arriving at any point in a system. The sniffer operates to extract certain data from each address. This data could be, for example, the IP address data and the physical address data. The extracted data is then used to access different data bases to determine if matches occur. Time stamps, sequencing and other parameters of each piece of data entering a system are used to control data access.

WO 02/100,039 ("System and method for traffic management control in a data transmission network", published 2002) discloses a traffic management system that sniffs data arriving at any point in a system. The sniffer operates to remember certain parameters pertaining to the data. When the amount of data arriving at the point begins to reach a critical level (usually dependent upon data processing capability associated with the point), the system begins to remove (and share) subsequent arriving data based, in part, upon the remembered parameters of recently received data. Data that is stored is returned to the system when the critical threshold recedes.

WO 02/087124 ("Network analyzer/sniffer with multiple protocol capabilities", published 2002) discloses systems and methods for automated testing of multiple-protocol network environments wherein data which is formatted according to a plurality of protocols in sequence is automatically identified and compared to determine whether the data has been correctly transformed from each protocol to the next. An indication of whether the data has been correctly transformed may be presented to a user, along with information about the data itself, such as commands which may be included therein. The information presented to the user is in a user-readable form rather than raw data in order to facilitate analysis of the information by the user.

U.S. Pat. No. 6,044,401 ("Network sniffer for monitoring and reporting network information that is not privileged beyond a user's privilege level", published 2000) discloses a method and system for locating available information in a network environment by a user in a node. In a system aspect, within a node in the network, the system disclosed in U.S. Pat. No. 6,044,401 includes a network sniffer and an access sniffer. The access sniffer includes an access element and an access interface. The access element preferably includes a memory and a database. The access element accesses the network sniffer and filters out unavailable information by using information such as address and port numbers gathered by the network sniffer. Unavailable information includes information which is non-public or beyond the privilege level of the particular user. The access element evaluates data streams which are public information to determine if the data streams meet a predetermined criteria. If the data streams meet the predetermined criteria, then the data is saved in the database. The access element transfers only the information available to the particular user to the access interface. The access interface. The access element can time itself for a limited amount of time for execution. Once the predetermined time period has expired, the access element is complete and it can save and transfer the appropriate information to the access interface.

U.S. Pat. No. 5,961,592 ("Screen identification system", published 1999) discloses a method of identifying computer screens is disclosed. The method is particularly useful in identifying IBM host screens in script creation and playback. According to the method, a signature is composed for a given screen. The signature comprises characteristics of a given screen which differentiate that screen from substantially different screen displays. For an IBM host screen, signature composition is based upon the screens protected fields. The protected fields are further processed by removing transient information such as the date and time.

U.S. Pat. No. 5,644,717 ("System for generating local area network operating statistics based on monitored network traffic and method therefore", published 1997) discloses a system for generating operating statistics for a network interconnecting at least two stations wherein each of those stations may send and receive messages during a session is implemented in software programmed to monitor the messages on the network, assign a direction to each of the messages with respect to the session based on the monitoring step, determine the role assumed by each of the stations based on the assigning step and calculate statistics for one of the stations based on the determining step.

U.S. Pat. No. 6,651,099 discloses a monitor for and a method of examining packets passing through a connection point on a computer network, each packet conforms to one or more protocols. The method of U.S. Pat. No. 6,651,099 includes receiving a packet from a packet acquisition device and performing one or more parsing/extraction operations on the packet to create a parser record comprising a function of selected portions of the packet. The parsing/extraction operations depend on one or more of the protocols to which the packet conforms. The method of U.S. Pat. No. 6,651,099 further includes looking up a flow-entry database containing flow-entries for previously encountered conversational flows. The lookup uses the selected packet portions and determines if the packet is of an existing flow. If the packet is of an existing flow, U.S. Pat. No. 6,651,099 classifies the packet as belonging to the found existing flow, and if the packet is of a new flow, the method stores a new flow-entry for the new flow in the flow-entry database, including identifying information for future packets to be identified with the new flow-entry. For the packet of an existing flow, the U.S. Pat. No. 6,651,099 updates the flow-entry of the existing flow. Such update may include storing one or more statistical measures. For any stage of a flow, state is maintained, and U.S. Pat. No. 6,651,099 performs any state processing for an identified state to further the process of identifying the flow. U.S. Pat. No. 6,651,099 thus examines each and every packet passing through the connection point in real time until the application program associated with the conversational flow is determined.

US 2003/0135,612 describes systems and methods of full time recording network traffic to a hierarchical data storage. Also described are systems and methods of retrieval of recorded network traffic from a hierarchically organized network data repository. Additionally there are systems and methods of efficiently filtering data in a hierarchically organized network data repository. Systems and methods of displaying recorded network data utilizing the retrieval systems are also included in US 2003/0135,612. Further included are systems and methods of providing sliding time window selection user interfaces.

SUMMARY OF THE INVENTION

By a certain aspect the invention provides an apparatus (107) for monitoring and auditing activity of a legacy environment, the apparatus comprising:

an analyzer (303) operative to analyze intercepted packets conveyed by entities (102, 103) in a network and to generate analyzed data based on information associated with at least some of said packets, the analyzed data being indicative of sessions;

a mirror manager (305) responsive to said analyzed data for generating data representative of mirror sessions, each mirror session corresponding to a session; and an audit event analyzer (307) for processing at least part of said data representative of mirror sessions and generating data representative of audit events, that include inbound audit events and outbound audit events, said outbound audit events including information representative of screens to be displayed on a terminal; and said inbound audit events including information representative of operations performed on a terminal.

Yet another aspect of the invention is to provide a method for monitoring and auditing activity of a legacy environment, the method comprising:

analyzing (202) intercepted packets conveyed by entities in a network;

generating (203) analyzed data based on information associated with at least some of said packets, the analyzed data being indicative of sessions;

responsive to said analyzed data generating (204) in respect of each one of one or more of said sessions data representative of a mirror session, each mirror session corresponds to a session; and processing at least part of said data representative of mirror sessions and generating (206) data representative of audit events that include inbound audit events and outbound audit events; said outbound audit events including information representative of screens displayable on a terminal; and said inbound audit events including information representative of operations performed on a terminal.

By another aspect the invention provides an apparatus for monitoring and auditing activity of legacy environments, the apparatus comprising:

an analyzer server operative to analyze headers of intercepted packets in a session and to generate analyzed packets based on information associated with said headers;

a mirror manager responsive to said analyzed packets for generating mirror sessions;

an audit event analyzer for processing said mirror sessions and generating audit events; and a business event analyzer for processing said mirror sessions and said audit events and generating business events.

According to certain embodiments the latter apparatus further comprising:

a long term storage memory for archiving said analyzed packets.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 5 is a flowchart illustrating in detail generation of data representative of mirror sessions, according to one embodiment of the invention;

FIG. 6C illustrates at least part of the data representative of the outbound audit event of FIG. 6A.

FIG. 6D illustrates at least part of the data representative of the inbound audit event including data illustrated in FIG. 6B.

FIG. 6E illustrates at least part of the data representative of the united audit event of FIG. 6B.

DETAILED DESCRIPTION OF THE INVENTION

Figure 1:
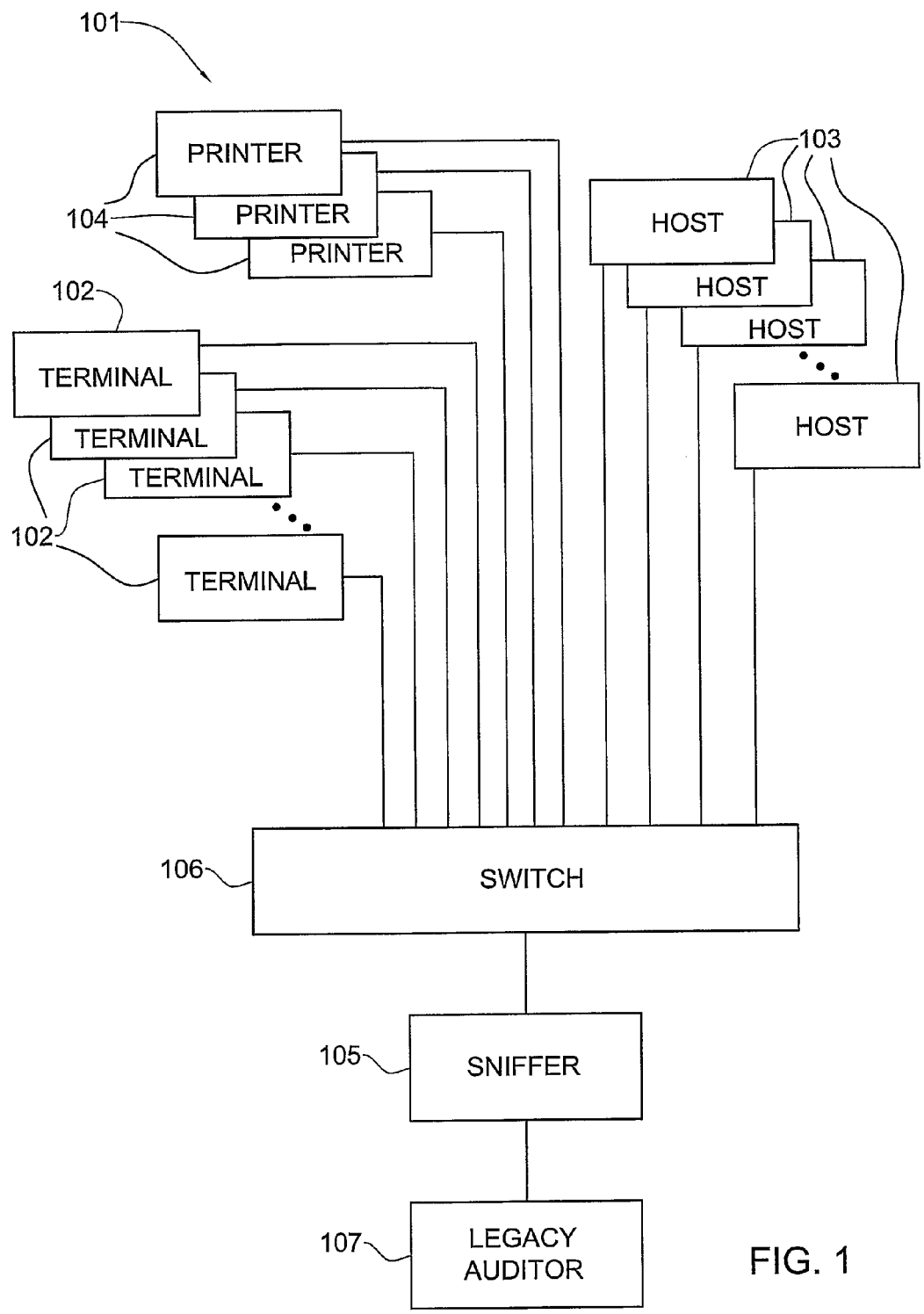
FIG. 1 is a block diagram illustrating a legacy environment that includes an apparatus for monitoring and auditing activity thereof, according to one embodiment of the invention.

In the following description components that are common to more than one figure will be referenced by the same reference numerals.

FIG. 1 is a block diagram illustrating a legacy system 101 that includes an apparatus for monitoring and auditing activity thereof, according to one embodiment of the invention. The legacy system 101 includes entities such as terminals 102 and hosts 103. For those versed in the art it is realized that terminals 102 usually operate in the legacy systems as clients, while hosts 103 operate as servers. This is non-limiting and alternative or additional entities can also be included in the legacy system. For example, the legacy system 101 includes also printers 104.

The system includes also at least one sniffer 105 that intercepts network traffic (i.e., packets) conveyed by the entities in the network. The sniffer 105 can connect to the network by any applicable mean, such as connecting to a mirror port of a network switch 106 as illustrated in the figure. It should be appreciated that each sniffer 105 can be pre-configured to intercept network packets conveyed by or to one certain host 103 in the legacy system 101. In a different embodiment at least some of the sniffers 105 can be pre-configured to intercept packets conveyed by or to more than one host.

Connecting the at least one sniffer 105 to a mirror port is non-limiting and alternative methods are also applicable, such as using network TAP devices.

The at least one sniffer 105 intercept host system packets carried by TCP/IP packets and System Network Architecture (SNA) packets that are conveyed by the terminals 102 and hosts 103. Generally, the packets intercepted by the sniffers are referred to as "intercepted packets".

Host system packets are packets that relate to legacy systems, including legacy screen protocols such as IBM Mainframe (3270 protocol), IBM iSeries (5250 protocol), Unisys (T27 and UTS protocols), Hitachi Mainframes (560 protocol), Fujitsu Mainframes (6680 protocol), Tandem (6530 protocol) etc.

The sniffer 105 is coupled to an apparatus 107 for monitoring and auditing activity of the legacy system, or shortly a "legacy auditor" 107, conveying intercepted packets thereto. It should be noted, however, that according to some embodiment the sniffer 105 is included, or is part of the legacy auditor 107, instead of being external and coupled thereto, as illustrated in FIG. 1.

Figure 2:
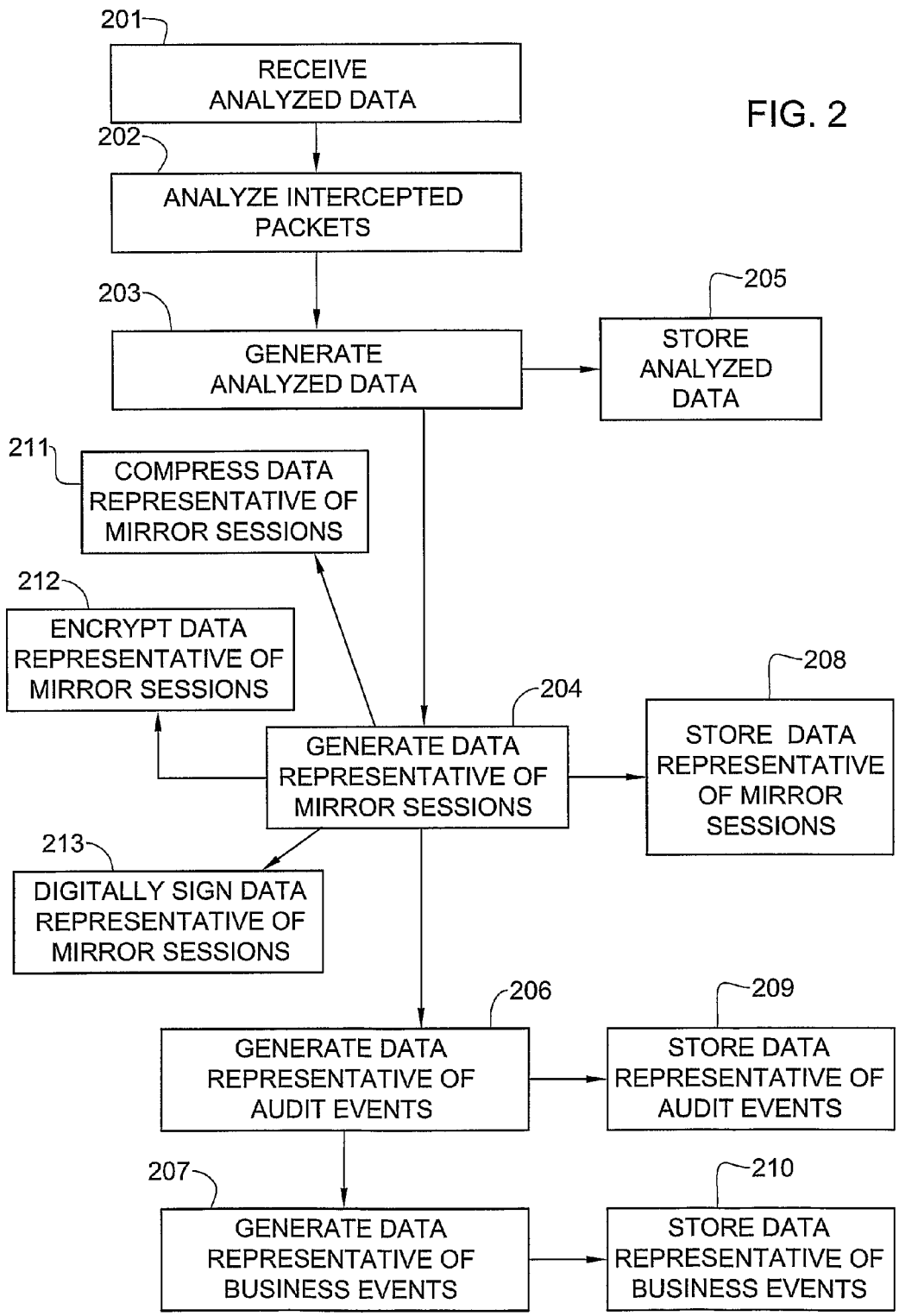
FIG. 2 is a flowchart illustrating the main procedures performed by an apparatus for monitoring and auditing activity in a legacy environment, according to one embodiment of the invention.

FIG. 2 is a flowchart illustrating the main procedures performed by a legacy auditor, such as the legacy auditor 107, according to one embodiment of the invention. The legacy auditor receives (201) an intercepted packet conveyed by entities in the legacy system. It should be understood that the legacy auditor can receive intercepted packets by any applicable way such as receiving them directly from the sniffer 105, reading packets from a storage device where they are stored, or, for example, receiving packets from any other networked device that can store and/or process packets.

In 202 the received intercepted packets are analyzed and in 203 analyzed data are generated based on information associated with the intercepted packets. During analysis 202 the legacy auditor 107 identifies whether the intercepted packet is part of an already open session held in the legacy system and monitored by the legacy auditor, or whether the legacy auditor is currently not aware of such a session. This identification is based on headers of the intercepted packets. If the packet is found to be part of a monitored session, this monitored session id is included in the analyzed data together with data included in the intercepted packet (i.e., data included in the header and content of the intercepted packet). Alternatively, if no such open monitored session is found, the legacy auditor allocates a new session id and includes it in the analyzed data. Thus, analyzed data are indicative of sessions. Apart from session id, analyzed data can include also additional information such as categorization of sessions (e.g., display and/or printer session categories).

In 204 at least part of the analyzed data is used for generating data relating to mirror sessions, wherein each mirror session corresponds to a session held in the legacy system.

Data relating to a mirror session includes analyzed data that correspond to a session held in the legacy system. It was previously explained that analyzed data consists of data included in an intercepted packet together with additional data such as session id etc. Thus, it is appreciated that data relating to a mirror session also consists of data included in an intercepted packet together with additional data. Yet, as usually there are more than one packet conveyed in a session, it is appreciated that data relating to a mirror session consists of data included in more than one intercepted packet, all these intercepted packets correspond to the same session held in the legacy system.

It is noted that a mirror session corresponds to a session, however, there may be sessions having no corresponding mirror session. For example, during analysis of intercepted packets the legacy auditor 107 identifies two sessions; one between a host $H_0$ and a terminal $T_0$ (therefore referred as an $H_0$–$T_0$ session) and another between the same host $H_0$ and a printer $P_0$ (therefore referred as an $H_0$–$P_0$ session). In 203 the legacy auditor 107 generates analyzed data that correspond to the two sessions. In 204 the auditor 107 can generate data representative of two mirror sessions ($H_0$–$T_0$ and $H_0$–$P_0$) or data representative of only one of the sessions ($H_0$–$T_0$ or $H_0$–$P_0$).

That is, data representative of a mirror session is generated in response to generated analyzed data, wherein each mirror session corresponds to a session.

According to several embodiments the legacy auditor 107 can store 205 analyzed data on a storage device, in addition or instead of generating data relating to mirror sessions. Doing this the legacy auditor 107 allows breaking up the process illustrated in FIG. 2, as it is possible to read the data from the storage device at some later time, e.g., in order to generate data representative of mirror sessions therefrom. It should be considered that sometimes only part of the analyzed data can be stored in 205 on the storage device.

In 206 the legacy auditor 107 further processes data representative of mirror sessions in order to generate data representative of audit events. An audit event is indicative of an operation performed by a user in the legacy system 101, an operation reflected on the user's screen. It is noted that the user can be a human operator, or it can be an automatic operator such as a computer program or macro that operate a terminal Examples of audit events are displaying screens on a terminal, typing data in data-fields, pressing buttons on a screen or keys on a keyboard. However, sometimes the initialization of a mirror session and/or the termination thereof are also considered as audit events.

It is noted that sometimes the legacy auditor 107 generates data representative of audit events corresponding to part of the mirror sessions, data representative thereto are generated in 204.

For example, in a legacy system including one host $H_0$, two terminals $T_0$ and $T_1$, and a printer $P_0$, during analysis of received packets the legacy auditor 107 identifies three sessions: $H_0-T_0$, $H_0-T_1$ and $H_0-P_0$. Data representative of two mirror sessions are generated: $H_0-T_0$ and $H_0-T_1$. Yet, data representative of audit events can be generated in correspondence with the two mirror sessions ($H_0-T_0$ and $H_0-T_1$) or in correspondence with only one of then ($H_0-T_0$ or $H_0-T_1$).

Back to FIG. 2, in 207 the legacy auditor 107 generates data representative of business events. In order to generate data representative of business events, at least part of the data representative of mirror sessions, and at least part of the data representative of audit events are processed. It should be noted that a business event can correspond to one or more mirror sessions and to one or more audit events. It is noted though, that each audit event corresponds to a mirror session, therefore, according to some embodiments, the data representative of an audit event can include the data representative of the corresponding mirror session that are required for the generation of data representative of business events. In such embodiments the legacy auditor 107 can generate data representative of business events by processing only data representative of audit events.

In an alternative embodiment it also possible to store data representative of mirror sessions (208), data representative of audit events (209) and/or data representative of business events (210) or part thereof.

In yet alternative embodiments, before, after or in parallel to storing (208) data representative of mirror sessions it is possible to compress (211), and/or encrypt (212) and/or digitally sign (213) the data using known per se methods.

Compressing (211) at least part of the data representative of mirror sessions can be done in any method known per se, such as the Lampel-Ziv method. Encrypting (212) at least part of the data representative of mirror sessions can be done in any method known per se, such as the PGP method. Digitally signing (213) at least part of the data representative of mirror sessions can be done in any method known per se, such as the DSA algorithm (Digital Signature Algorithm).

Yet additional embodiments can generate alerts in respect of at least one of the business events, data representative thereof was generated in 207. It is noted that generating at least some of the alerts can be based on predetermined thresholds.

An example to a business event is opening a new bank account. The clerk opens a screen named "new customer information" where he types customer information such as his name, id and address. The information is typed in three dedicated data fields. Then the clerk presses enter and receives a second screen named "financial information" where he types the initial financial information of the customer, such as his initial credit and presses enter.

The mirror session consists of all the data included in packets transferred between the clerks' terminal and the host (in both directions), since the clerk has started the session, for example, in the morning when he turned on his terminal. Thus, the mirror session consists also of data included in those packets relating to the new customer information screen and to the financial information screen. The audit events according to this example are displaying the new customer information screen, conveying the customer information to the host, displaying the financial information screen and again conveying the financial information to the host.

In a more complicated example, after conveying the financial information to the host the clerk waits for receiving on-line approval that the bank account can be opened, e.g., from the manager. That is, the manager has to approve opening of a new account before the operation is completed. To this end, after the clerk conveys the financial information to the host, a "new account approval" screen is displayed on the manager's terminal, where he can press "approve" or "disapprove". It is appreciated that displaying the new account approval screen and the manager's response is part of the manager's session with the host and not part of the clerk's session. Displaying the new account approval screen and conveying the approved/disapproved response are two audit events in the manager's session.

Now, an "account approved" or an "account disapproved" screen is displayed on the clerk's terminal, indicating that opening the new account is terminated with success or failure. Displaying the screen is again an audit event in the clerk's session. When the clerk presses the enter key in his keyboard the screen the account is considered as open.

Altogether this whole scenario comprises one business event, i.e., opening a new bank account. This business event combines two sessions and eight audit events.

Figure 3:
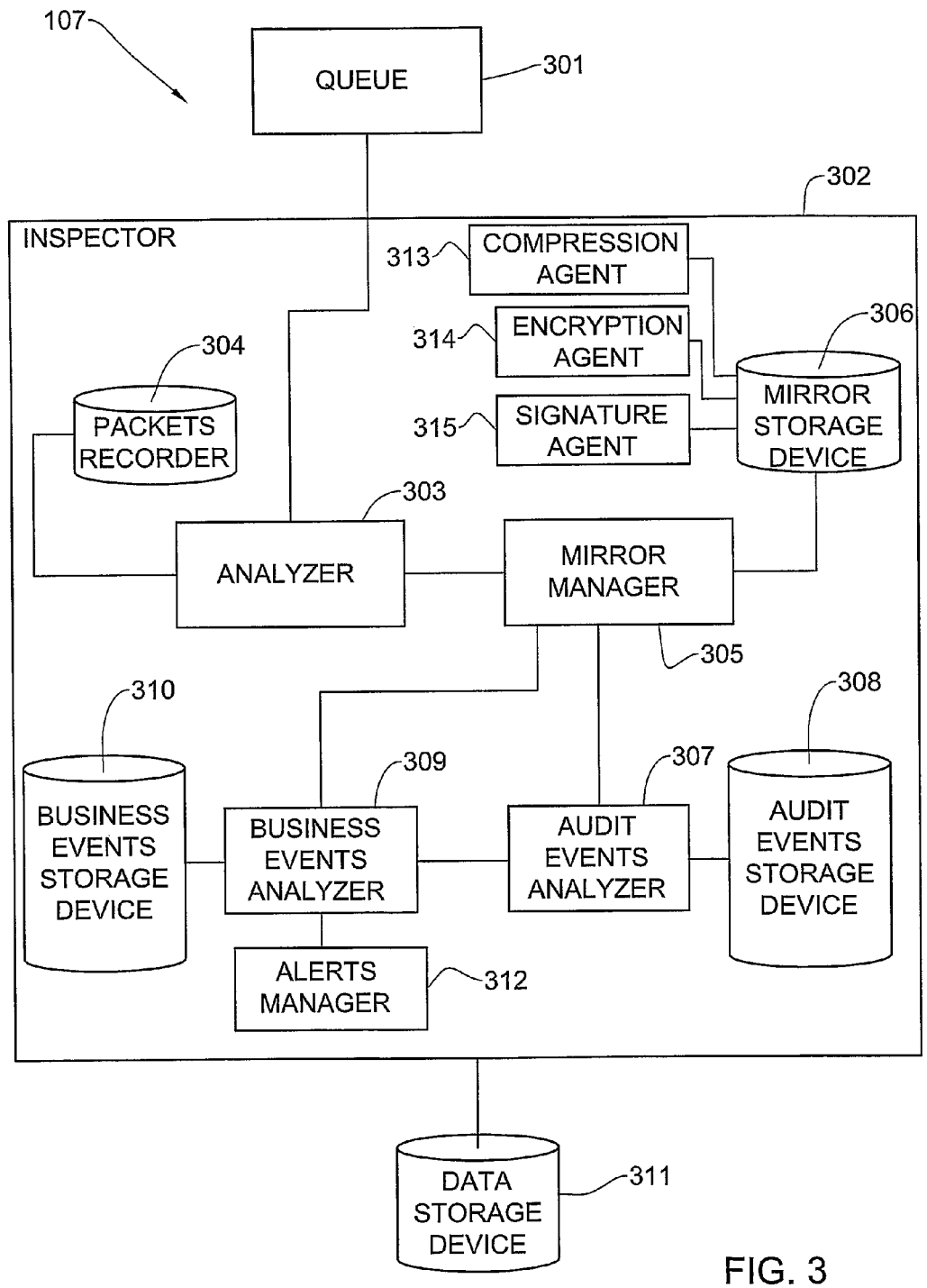
FIG. 3 is a block diagram illustrating an apparatus for monitoring and auditing activity in a legacy environment, according to one embodiment of the invention.

FIG. 3 is a block diagram illustrating a legacy auditor 107, in a legacy system such as the legacy system 101, according to one embodiment of the invention. According to the embodiment, intercepted packets received by the legacy auditor 107 are kept in a queue 301, coupled to and/or accessible by an inspector 302. The inspector 302 is sometimes referred also as an "analyzer server". It should be appreciated that the intercepted packets are, for example, intercepted packets conveyed by at least one sniffer 105. However, the inspector 302 is not necessarily coupled to the sniffer 105. It can also receive intercepted packets from other sources, such as reading them from a storage device.

It is appreciated that the queue 301 can be realized by any applicable way, such as a queue data structure known per se, realized in software. However, it is also possible to utilize the file system queue, for example.

The inspector 302 includes a packets analyzer, or shortly, an analyzer 303. The analyzer accesses intercepted packets (such as 3270 packets) kept in the queue and analyzes the data included therein. The analyzer 303 generates data (referred to as "analyzed data") that is representative of sessions occurring in the legacy system 101.

A storage device named "packets recorder" 304 is coupled to the analyzer 303. According to one embodiment, the analyzer 303 stores data included in intercepted packets and/or analyzed data on the packets recorder 304. Alternatively, the packets recorder 304 can store data included in intercepted packets while a different storage device can be used for storing (sometimes referred also as "archiving") analyzed data or vice versa. It was further explained that analyzed data consists of data included in intercepted packets together with additional information such as session identification (session id), session categorization and/or other kinds of information.

Returning to FIG. 3, a mirror sessions manager or shortly a mirror manager 305 is coupled to the analyzer 303 for receiving analyzed data therefrom. The mirror manager 305 is responsive to the analyzed data for generating data representative of mirror sessions, each mirror session corresponding to a session. Alternatively, the mirror manager can be coupled to the packets recorder 304, reading analyzed data therefrom, instead of being directly coupled to the analyzer 303.

It should be noted that the mirror manager 305 does not necessarily process all the analyzed data that are available thereto. That is, the mirror manager 305 is responsive to at least part of the analyzed data.

The mirror manager can be coupled to a "mirror storage device" 306 for storing the data representative of mirror sessions therein. It should be appreciated that the mirror storage device 306 can be a tangible storage device such as a disk or RAID (Redundant Array of Independent or Inexpensive Disks), or a partition thereof, with or without a database. It can also be a virtual storage device such as a storage device accessed via the internet, etc. In addition, the mirror storage device 306 can be a storage device dedicated only for data representative of mirror sessions, or it can be a storage device commonly used for additional kinds of data, such as intercepted packets and/or data representative of sessions (e.g., the packets recorder 304 can be used also as a mirror storage device 306).

According to one embodiment the mirror manager 305 stores files on the mirror storage device 306, each file includes data representative of one mirror session. Yet, this is non-limiting and those versed in the art will appreciated that alternative storage models exist, such as storing the data in a storage device that is a database, wherein there is a table for each mirror session.

An audit events analyzer 307 is coupled to the mirror manager 305 for processing data representative of mirror sessions generated thereby and generating data representative of audit events. That is, the audit events analyzer 307 is adapted for receiving data representative of mirror sessions, generating data representative of audit events, i.e., events that are indicative of operations performed by users in the legacy system 101, operations reflected on the users' screens.

As before, in an alternative embodiment the audit events analyzer 307 can be coupled to the mirror storage device 306 for receiving data stored therein, instead of being directly coupled to the mirror manager 305.

It should be noted that the audit events analyzer 307 does not necessarily process all the data representative of mirror sessions that are available to it. That is, the audit events analyzer 307 can process at least part of the data representative of mirror sessions.

The audit events analyzer 307 can be coupled to an "audit events storage device" 308 for storing the data representative of audit events therein. It should be appreciated that the audit events storage device 308 can be a tangible storage device such as a disk or RAID (Redundant Array of Independent or Inexpensive Disks), or a partition thereof, with or without a database. It can also be a virtual storage device such as a storage device accessed via the internet, etc. In addition, the audit events storage device 308 can be a storage device dedicated only for data representative of audit events, or it can be a storage device commonly used for additional kinds of data, such as intercepted packets and/or data representative of sessions and/or data representative of mirror sessions (e.g., the packets recorder 304 or the mirror storage device 306 can be used also as an audit events storage device 308).

A business events analyzer 309 is coupled to the audit events analyzer 307 and to the mirror manager 305. The business events analyzer 309 is capable of processing data representative of mirror sessions and data representative of audit events and generating data representative of business events. That is, the business events analyzer 309 is capable of receiving data representative of mirror sessions and data representative of audit events, processing these data or part thereof and generating data representative of business events. As was already mentioned before, in an alternative embodiment the business events analyzer 309 can be coupled to the mirror storage device 306 and/or to the audit events storage device 308 for receiving data stored therein, instead of being directly coupled to the mirror manager 305 and/or the audit events analyzer 307, respectively.

It should be noted that the business events analyzer 309 does not necessarily process all the data representative of mirror sessions and/or all the data representative of audit events that are available to it. That is, the business events analyzer 309 can process at least part of the data representative of mirror sessions and at least part of the data representative of audit events.

It was previously mentioned, with reference to FIG. 2, that sometimes the data representative of audit events can include data representative of the corresponding mirror session that are required for the generation of data representative of business events. In such embodiments, the business events analyzer 309 can generate data representative of business events by processing only data representative of audit events. Thus, in such embodiments the business events analyzer 309 can be coupled only to the audit events analyzer (unlike the embodiment of FIG. 3, where the business events analyzer 309 is coupled to the audit events analyzer 307 and to the mirror manager 305).

The business events analyzer 309 can be coupled to a "business events storage device" 310 for storing the data representative of business events therein. It should be appreciated that the business events storage device 310 can be a tangible storage device such as a disk or RAID (Redundant Array of Independent or Inexpensive Disks), or a partition thereof, with or without a database. It can also be a virtual storage device such as a storage device accessed via the internet, etc. In addition, the business events storage device 310 can be a storage device dedicated only for data representative of business events, or it can be a storage device commonly used for additional kinds of data, such as intercepted packets and/or data representative of sessions and/or data representative of mirror sessions and/or data representative of audit events (e.g., the packets recorder 304, the mirror storage device 306, or the audit events storage device 308 can be used also as a business events storage device 310).

In addition, in some embodiments an alerts manager 312 can be coupled to the business events analyzer 309 for generating (or raising) alerts when certain business events occur.

It is noted that sometimes the inspector 302 can be coupled to a data storage device 311 in addition or instead of including the packets recorder 304, and/or the mirror storage device 306, and/or the audit events storage device 308, and/or the business events storage device 310. This data storage device 311 can be used for storage of analyzed data, and/or data representative of mirror sessions, and/or data representative of audit events, and/or data representative of business events respectively.

In alternative embodiments the mirror storage device can be coupled also to a compression agent 313, and/or to an encryption agent 314, and/or to a signature agent 315. It is noted that the compression agent 313 can compress at least part of the data representative of mirror sessions in any method known per se, such as the Lampel-Ziv method. Furthermore, the compression agent can compress the data representative of mirror sessions before, after or in parallel to storing them (or at least part of them) in the mirror storage device 306.

The encryption agent 314 can encrypt at least part of the data representative of mirror sessions in any method known per se, such as the PGP method. Furthermore, the encryption agent can encrypt the data representative of mirror sessions before, after or in parallel to storing them (or at least part of them) in the mirror storage device 306.

The signature agent 315 can sign at least part of the data representative of mirror sessions in any method known per se, such as the DSA algorithm (Digital Signature Algorithm). Furthermore, the signature agent can sign the data representative of mirror sessions before, after or in parallel to storing them (or at least part of them) in the mirror storage device 306.

Those versed in the art will appreciate, though, that the compression agent 313, and/or to the encryption agent 314, and/or to the signature agent 315 can be coupled to the mirror manager 305, in addition to or instead of being coupled to the mirror storage device 306.

Figure 4:
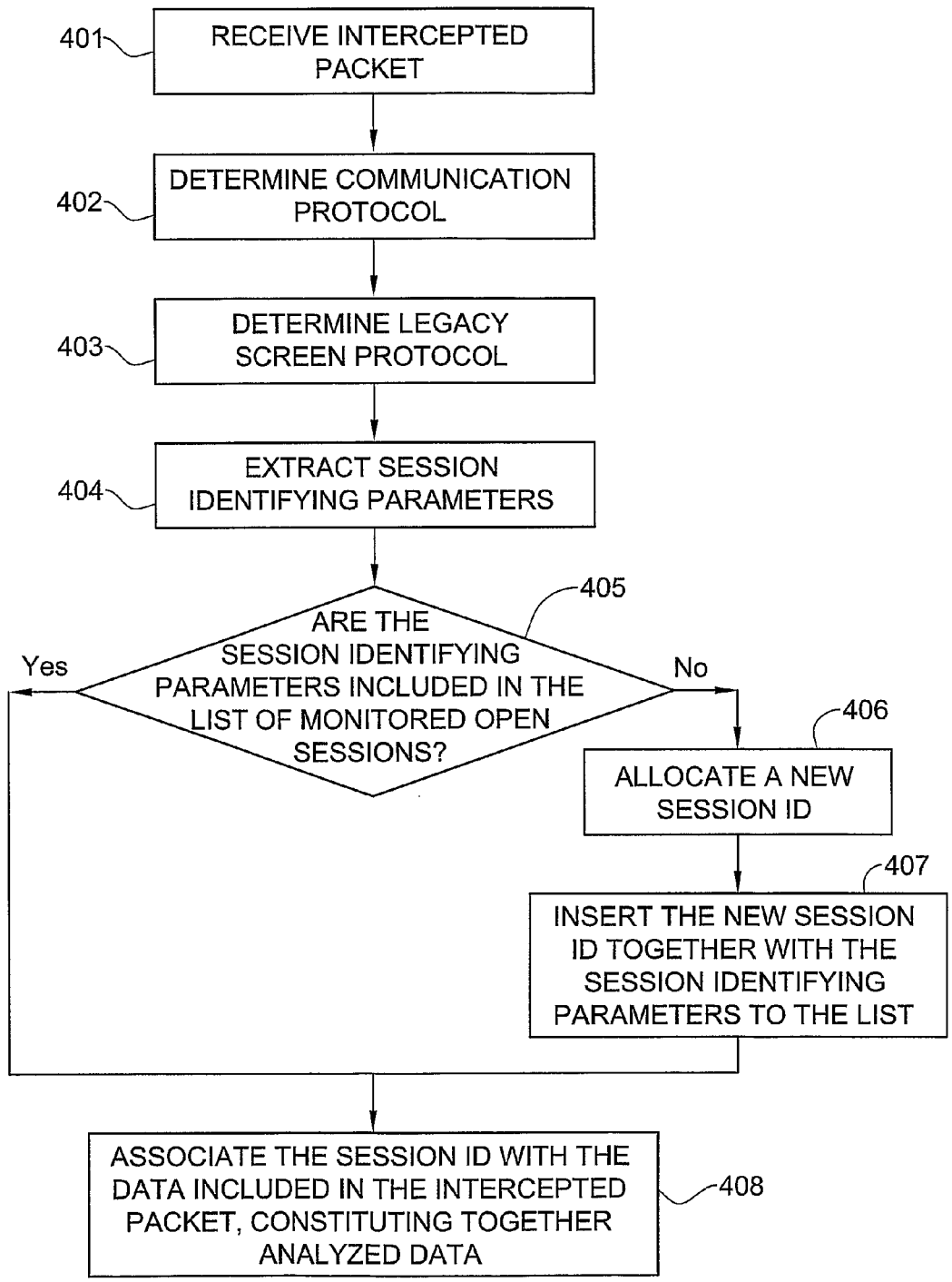
FIG. 4 is a flowchart illustrating in detail how intercepted packets are analyzed, according to one embodiment of the invention.

After describing an exemplary flowchart illustrating the main procedures performed by an apparatus for monitoring and auditing activity in a legacy environment (FIG. 2) and an exemplary block diagram illustrating such an apparatus (FIG. 3), FIG. 4 further provides detailed description of intercepted packets analysis, performed by the analyzer 303, according to one embodiment of the invention.

The flowchart of FIG. 4 refers to 3270 packets carried by SNA packets, yet this is non-limiting and those versed in the art will appreciate that similar or resembling procedures can be applied for other protocols such as 3270 packets carried by TCP/IP or other legacy screen protocols. It should be noted that packets sent from a host to a client entity such as a terminal or a printer are referred to as outbound packets, while packet sent from a client to a host are referred as inbound packets.

In 401 the analyzer receives an intercepted packet. As was already mentioned before, the analyzer can receive intercepted packets from a queue (such as queue 301). More generally, the analyzer can receive intercepted packets form any available source, such as a sniffer (e.g. 105 in FIG. 1) or a database.

In 402 the communication protocol (TCP/IP or SNA) is determined and in 403 the packet is analyzed in order to determine its legacy screen protocol (3270 etc.).

Appreciating that an intercepted packet is being part of a session, and that the intercepted packet header include session identifying parameters, in 404 the session identifying parameters are extracted from the intercepted packet's header, allowing session identification. For example, in SNA the session identifying parameters are the client's MAC address, PU (Physical unit) and LU (Logical unit) known per se. while in TCP/IP the session identifying parameters are the server's IP address and port, as well as clients' IP address and port. It was previously explained that in connection with the legacy auditor 107, each sniffer 105 is sometimes pre-configured to intercept network packets conveyed by or to one certain host 103 in the legacy system 101. Therefore it is appreciated by those versed in the art that the identity of the host the intercepted packet is conveyed thereto or thereby can be determined. However, in those cases when at least one of the sniffers 105 is pre-configured to intercept packets conveyed by or to more than one host 103 the identity of the host an intercepted is conveyed by or to can be determined in accordance with the host's MAC address, PU and LU, as indicated by the packet's header.

The analyzer has access to a list, or group, of open sessions that the legacy auditor currently monitors. The list can be stored in a data structure in memory, it can be store in a database, or it can be handled in any other way applicable to the case. For each open session listed therein, a session identification (session id) is listed together with the legacy screen protocol identification, the communication protocol identification, and the session identifying parameters. The session id can be any data structure applicable to the case, such as a numerical value, a string of characters, a structure of some sort etc.

In 405 the analyzer searches the monitored open sessions list in order to determine if the intercepted packet's session identifying parameters are listed therein and if so, the intercepted packet's respective session can be identified. If the session identifying parameters are not found in the list, in 406 the analyzer allocates a new session id for it and in 407 it adds this session id together with the intercepted packet's session identifying parameters to the list. The new session id is now associated with the session identifying parameters, i.e., the intercepted packet's session can be identified.

In 408 the session id associated with the session is added to the data included in the intercepted packet (including header and content) constituting together analyzed data.

It should be noted that the described flowchart is non-binding and other methods and procedures can be applied for generating analyzed data. For example, in a different embodiment session categorization data can be associated with the data included in the intercepted packet (with or without a session id), constituting together analyzed data. Other embodiments can associate therewith host identification and/or indication whether the intercepted packet is an outbound or an inbound packet etc. Yet a different embodiment can include in the list of monitored open sessions a timestamp, indicative of the time when the session was detected on the first time (i.e., the time when the session id was allocated) etc.

After seeing an exemplary embodiment of an analyzer 303, FIG. 5 is a flowchart illustrating in detail generation of data representative of mirror sessions in the mirror manager 305, according to one embodiment of the invention.

Knowing that a session has a beginning and an end, there are expected to be known packet types that start and terminate a session, constituting a connect and a disconnect packet. In TCP/IP, for example, a SYN packet is considered as a connect packet and a FIN packet is considered a disconnect packet.

Thus, after receiving analyzed data in 501, in 502 the mirror manager 305 determines whether this is a connect packet. If so, identifying that a new session has started, in 503 the mirror manager extracts the mirror session information from the analyzed data, such as session id and/or identity of the host and client participating in the session, time stamp etc. In 504 a new mirror session is opened. For example, a new file is opened in the mirror storage device 306 to include data representative of the mirror session (wherein each mirror session corresponds to a session). Alternatively, a table can be generated in a data base of this mirror session etc. In addition, the session id together with the additional information and the new file (or table) identification are listed (together constituting mirror session information) in a database. It should be noted that the mirror manager can assign a mirror session id to each newly opened mirror session. However, by keeping the mirror session id similar to the mirror session's corresponding session id, analysis is simplified wherein analyzed data can be directly matched with mirror sessions ids.

Remembering that analyzed data consists also of data included in the intercepted packet, it can be understood that the mirror manager has access to the data included in the intercepted packet. Thus, in 505 the data included in the intercepted packet (including header and content) are stored in association with mirror session information, for example, in the file identified in the mirror session information or in a table identified in the mirror session information etc.

However, if on 502 the mirror manager finds that the intercepted packet is not a connect packet, it can be a disconnect packet or an in-session packet, e.g., a packet that is part of an already open session. Either way, in most cases the mirror manager expects to find an already open mirror session corresponding to the analyzed data. In order to identify and locate this already open mirror session, in 506 the mirror manager extracts the session id from the analyzed data.

Further on, the mirror manager tries to match the extracted session id (see 506) with open mirror sessions ids. If in 507 the mirror manager finds an open mirror session having the same id as the extracted session id, in 508 it checks whether the intercepted packet is a disconnect packet. If so in 509 the mirror session is closed, for example by marking in the database that the mirror session is closed, and/or by instructing the system to close the mirror session's file immediately after the next write (the data included in the mirror session are still needed to be stored in the file) and/or by instructing the analyzer 303 to remove this session from its list of monitored open sessions. In 505 the data included in the intercepted packet are stored.

However, if in 508 the mirror manager finds the intercepted packet is not a disconnect packet (i.e., it is an in-session packet) the data included in the intercepted packet are stored (see 505) and the mirror manager can receive additional analyzed data (501).

Returning to 507, if the mirror manager finds that there is no open mirror session with a mirror session id that is similar to the extracted session id, and remembering that this is not a connect packet (see 502), it is assumed that the intercepted packet belongs to an already open session, yet from one reason or another the legacy auditor does not monitor this session (for example, it is possible that the legacy auditor did not operate when the session was opened). Thus, in 511 the mirror manager checks if the intercepted packet is a disconnect packet. It is appreciated that in the case that the intercepted packet is a disconnect packet in 512 the mirror manager instructs the analyzer to remove the session from its list of monitored open sessions and afterwards the mirror manager is ready to receive additional analyzed data. However, if the intercepted packet is found (in 511) to be an in-session packet, it is appreciated that in-session packets sometimes include partial mirror information (such as client and host identity). Therefore, in 513 the mirror manager extracts mirror information from the analyzed data, in 504 it opens a new mirror session and in 505 it stores data included in the intercepted packet.

Before turning to describe how data representative of audit events are generated, it should be realized that audit events are related to screens displayed on terminals. It is appreciated that legacy screen protocols are based on characters' information.

Figure 6A:
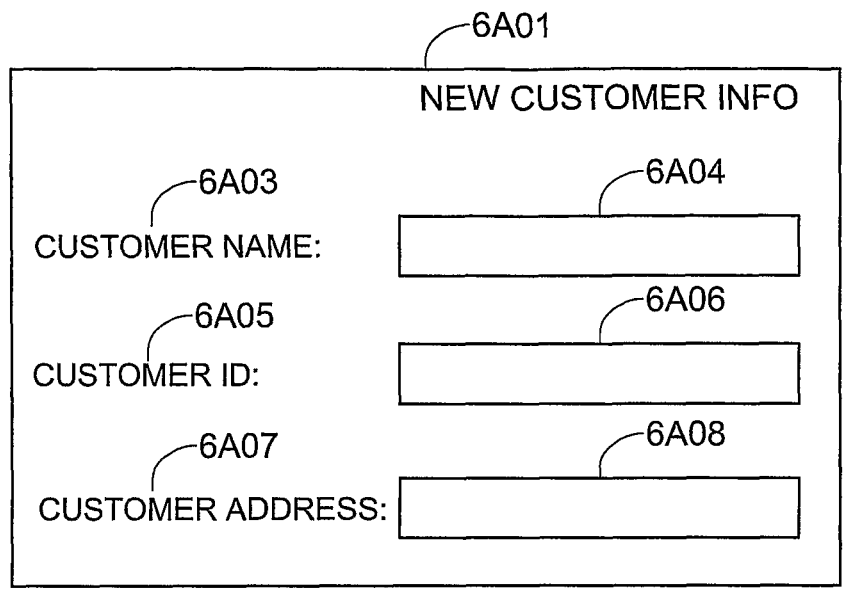
FIG. 6A illustrates an exemplary screen displayed on a terminal of a clerk in a bank, when opening a new bank account.

Returning to the example of opening a new bank account, an exemplary new customer information screen 6A01 is illustrated in FIG. 6A. It is known per se that in a legacy screen protocol, in order to display the screen on a terminal, the host conveys data representative of the screen to the terminal Data representative of a screen includes, for example, fields to be displayed on the terminal, their respective attributes (read only or input field, whether an input field allows input of any character, a limited set of characters or possibly a numerical value), additional characteristics (such as position on the screen, font and color used, field length in characters etc) and text that should be displayed therein. Thus, in the exemplary screen 6A01 illustrated in FIG. 6A there are seven fields, one of them (6A02) includes the screen title; another one (6A03) includes the text "Customer name:"; the field 6A04 is an input field for receiving characters as input; 6A05 includes the text "Customer ID:"; 6A06 is an input field for receiving numerical values as input; 6A07 includes the text "Customer address:"; and 6A08 is an input field receiving characters as input.

The fields included in a screen, together with their characteristics and possibly also additional characteristics of the whole screen (such as background color) are referenced together as the screen characteristics.

Thus, by recognizing the screen characteristics it is possible that the screen can be recognized. If, according to one embodiment each screen supported by a host 103 has an identification (constituting "screen id"), wherein a list of the available screen ids and their characteristics are stored in the system, such as in a table or a list, then it is possible to query the table, searching for the recognized screen characteristics, identifying the respective screen id. It should be appreciated though that other embodiments are allowed as well. For example, wherein there is no pre-configured table of screen ids and their respective characteristics. Instead, when recognizing a screen the table is scanned. If the recognized characteristics are not found in a table of screen ids and their respective characteristics, a new screen id is allocated for the recognized characteristics, and they (the recognized characteristics and the newly allocated screen id) are inserted into the table. That is, the table is dynamically updated.

Furthermore, knowing the order and/or position by which different fields appear in the screen 6A01, each field can be given an identification. For example, field 6A02 can be identified as "new customer header"; 6A03 "name title"; 6A04 "name input"; 6A05 "id title"; 6A06 "id input"; 6A07 "address title"; and 6A08 "address input". It is appreciated though that field identification (hereinafter "field id") as well as screen ids should not necessarily be strings of characters. Numerical values or any other data structure can also be used as field ids when applicable.

Returning to FIG. 5, it is appreciated that data representative of mirror sessions include headers and contents of intercepted packets. A terminal in a legacy system is a dumb terminal, i.e., all the screens displayed on it are conveyed thereto by a host. Therefore, analysis of outbound intercepted packets' headers and contents can reveal information representative of screens displayed on terminals, including screen and field characteristics, wherein it is appreciated that a packet's header indicates whether it is an outbound or an inbound packet. The information representative of a screen is sometimes referred to also as a "presentation space".

Similarly, analysis of inbound intercepted packets can reveal information representative of operations performed by the user on a screen (such as filling the customer name, id and address) and conveyed to the host.

Yet before turning to describe how data representative of audit events are generated it should be appreciated that a session normally starts with displaying on a terminal a predetermined screen (referred to as a "predetermined connection screen"), such as a login screen. This means that the host conveys packets to the terminal; one or more of these packets include information representative of the predetermined connection screen. It is already understood that data corresponding to a mirror session can be generated in respect of this session, i.e., the data representative of this mirror session also includes information representative of the predetermined connection screen.

In other words, the first audit event in a mirror session starting with a connect packet is displaying the predetermined connection screen.

Furthermore, it is expected that the user will log into the host by typing his name and password and pressing enter, for example. Thus, the terminal conveys to the host packets with information representative of the operations performed by the user, such as typing information and pressing enter. It can be understood that the second audit event, in accordance with this example corresponds to these packets.

The third audit event can be a menu including optional operations the user can perform (in other words: a list of optional screens she can display), and the fourth audit event will include the user's choice. If her choice will be to open a new bank account, the screen illustrated in FIG. 6A will be conveyed to her terminal. That is, displaying the screen illustrated in FIG. 6A is an example of an audit event.

Figure 6B:
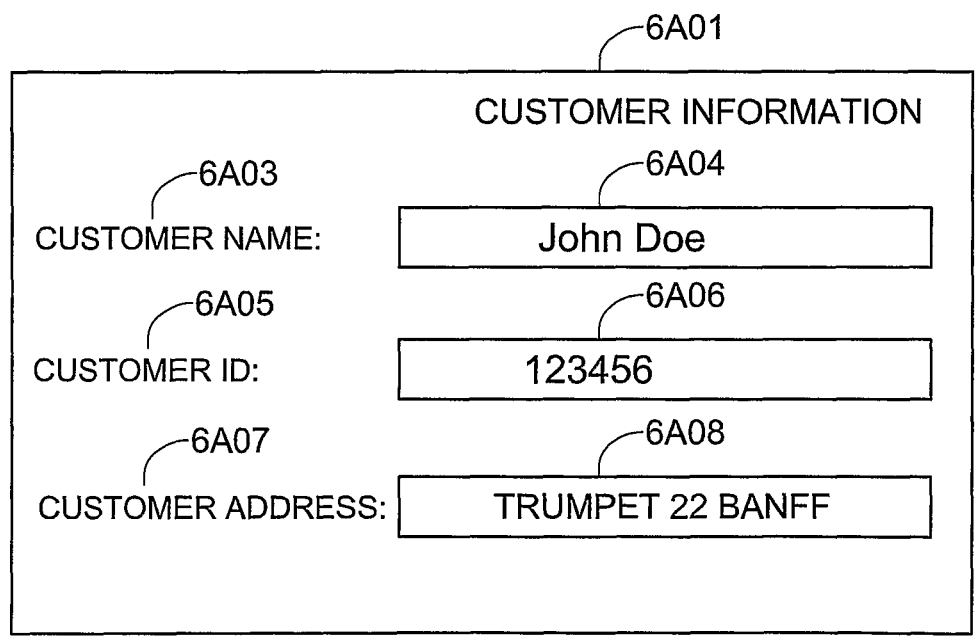
FIG. 6B illustrates the same screen of FIG. 6A, where the input fields include information.

Then, the user will type in the customer's information, as illustrated, for example, in FIG. 6B, wherein the information including the customer information will be conveyed to the host. Conveying the information representative of the screen illustrated in FIG. 6B is, according to the example, the coming audit event.

FIG. 6C illustrates at least part 6C01 of the data representative of the outbound audit event of displaying the new customer information screen of FIG. 6A. In the figure, 01 means "change screen", "C3" stands for UNLOCK KEYBOARD and Every occurrence of "11 xx yy" means that the position of the field is calculated based on xx and yy. For example, 11 40 40 means position row 1 column 1 on the screen. Every occurrence of "1d zz" means a new field in this location and its attributes described by zz. The rest are instructions for how to draw the screen. The right side contains a translation from hex to visible characters.

FIG. 6D illustrates at least part 6D01 of the data representative of the inbound audit event including data illustrated in FIG. 6B. This part represents the data inserted by the user, i.e., Customer Name: John Doe; Customer ID: 123456; and Customer Address: TRUMPET 22 BANFF. In this example, "7D" means "Enter"; "C6 7B" is the cursor position; and the rest are instructions to put specific data representative of part of the screen in specific locations.

Finally, FIG. 6E illustrates at least part 6E01 of the data representative of the united audit of FIG. 6B. It should be appreciated that 6E01 is similar to 6C01, but include the data of 6D01.

As long as the user does not logout of the system, allowing another user to login, it is possible to deduce that the logged-in user is associated with the terminal. Therefore, it is possible to include an indication to that user (such as user name or user id) in the data representative of the audit events.

However, in those cases when the mirror session does not start with a connect session (see, for example, 513, 504 and 505 in FIG. 5), the first audit event can be different than the predetermined connection screen. In this case the legacy auditor may not be able to associate a user indication with the data representative of the first and possibly also the coming audit events.

It should be noted though, that the predetermined connection screen can be used in additional opportunities apart from the beginning of a session. In the example that the predetermined connection screen is a login screen it is known by those versed in the art that a user can logout in the middle of a session, allowing a different user to loin.

Figure 7:
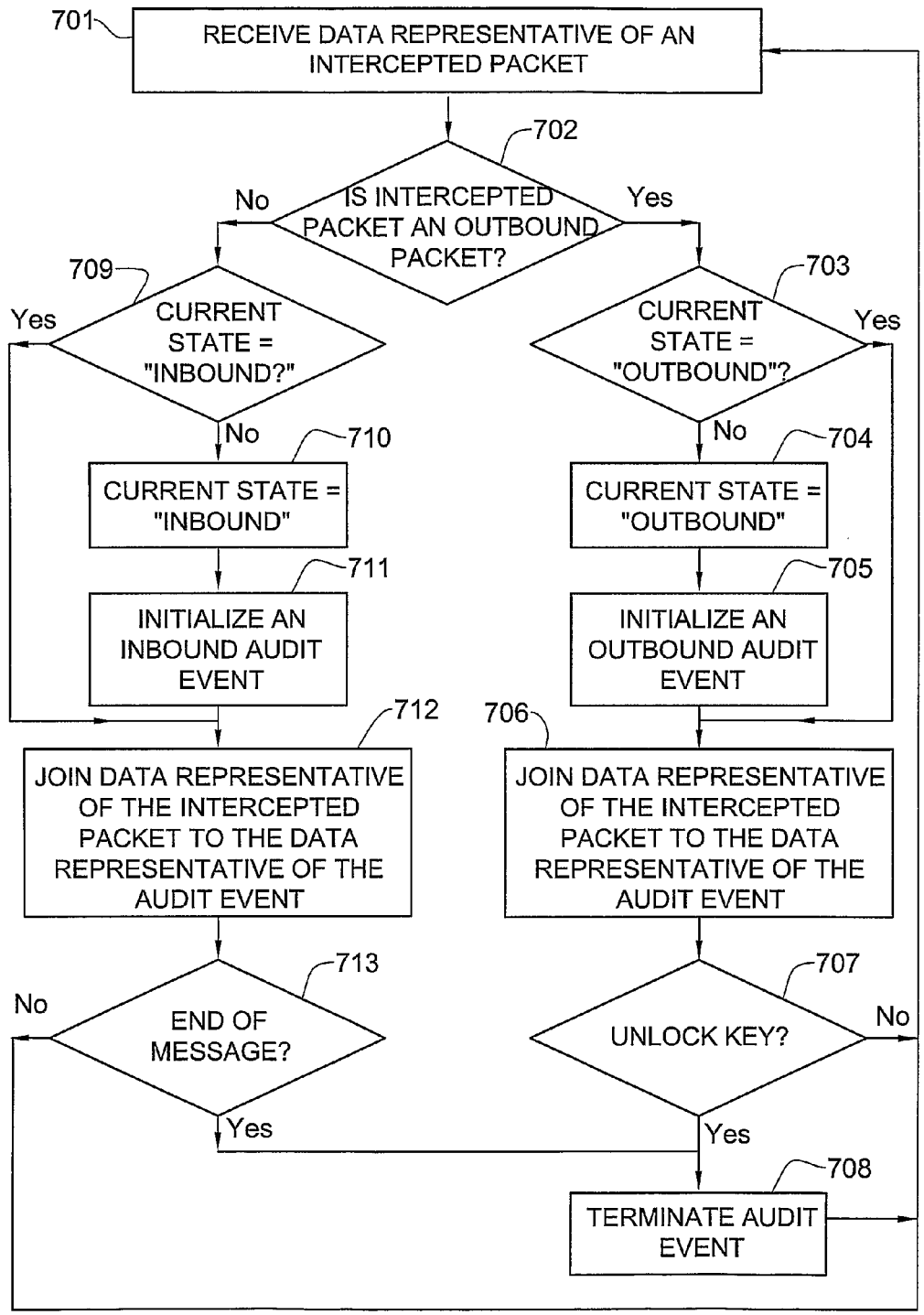
FIG. 7 is a flowchart illustrating in detail generation of data representative of audit events, according to one embodiment of the invention.

FIG. 7 is a flowchart illustrating in detail generation of data representative of audit events, according to one embodiment of the invention. The generation of data representative of audit events occur, for example, in the audit events analyzer 307. In 701 data representative of a mirror session is received. It is appreciated that the data representative of a mirror session consists at least of analyzed data including intercepted packets, i.e., data representative of a mirror session is also representative of intercepted packets, all the intercepted packets correspond to the same session. Thus, when receiving data representative of a mirror session, the audit events analyzer actually receives data representative of intercepted packets, receiving them in the same order by which they were conveyed to/form the host and terminal.

In 702 the audit events analyzer checks whether the intercepted packet is an outbound or an inbound packet. As was previously explained, outbound packets correspond to a screen conveyed by the host, to be displayed on the terminal, while inbound packets correspond to data conveyed by terminal to the host.

If in 702 the packet is determined to be an outbound packet, the packet belongs to an outbound audit event. Yet, the intercepted packet can indicate that the audit event has just started, or alternatively it can be an in-audit-event packet. In order to determine which of the two alternatives corresponds to the intercepted packet, the audit events analyzer keeps a status variable that indicates whether currently the status is outbound or inbound. If in 703 it is found that the current state is other than outbound, that means that the currently analyzed outbound packet starts a new outbound audit event. Therefore, in 704 the current state is set to be outbound and in 705 a new audit event is initialized for storing data representative of the audit event. For example, a new file is opened and/or a table in a database is initialized etc. The file can include data representative of intercepted packets, together with additional data such as an indication of the event being an outbound or inbound audit event and a timestamp indicative of the time when the event started and/or terminated.

Whether in 703 the audit events analyzer found that the current state was outbound or inbound, in 706 the data representative of the intercepted packet is appended to the data representative of the audit event.

Furthermore, those versed in the art will appreciate that in order to display a screen on a terminal, the host conveys outbound packets thereto. In order to allow a user to operate, update or insert data into the screen the host conveys an UNLOCK KEYBOARD indication to the terminal. Thus, the UNLOCK KEYBOARD indication marks the end of an outbound audit event.

Therefore, in 707 the audit events analyzer verifies if the packets includes an UNLOCK KEYBOARD indication, and if so, in 708 the audit event is terminated, for example, by adding a termination timestamp and closing the file.

However, if in 702 the audit events analyzer finds that the intercepted packet is an inbound packet, this means that the packet is part of an inbound audit event. In 709 the analyzer checks if the current state is other than inbound. If so (the currently analyzed inbound packet starts a new inbound audit event), in 710 the current state is set to be inbound and in 711 a new audit event is initialized for storing data representative of the audit event.

Whether in 709 the audit events analyzer found that the current state was outbound or inbound, in 712 the data representative of the intercepted packet is appended to the data representative of the audit event.

Furthermore, those versed in the art will appreciate that when screen information is conveyed by a terminal to a host, an "end of message" indication is included in the inbound packets. For example, in telnet the hexadecimal string "FF EF" is accepted. Thus, the end of message indication marks the end of an inbound audit event.

Therefore, in 713 the audit events analyzer verifies if the packets includes an end of message indication, and if so, in 708 the audit event is terminated, for example, by adding a termination timestamp and closing the file.

It is appreciated that it is possible to convey the data representative of intercepted packets stored in association with an outbound audit event to a known per se terminal emulation program, for example, in order to display the screen as it previously displayed on the terminal. Yet, displaying an inbound audit event is more complicated, since the inbound audit event is generated by the terminal and conveyed to the host. That is, the terminal generates the inbound audit event and does not display it. In order to display the information conveyed in an inbound audit event in the context of the screen where it was inserted by the user it is required to analyze the audit event; extract conveyed information therefrom; associate the inbound audit event with an outbound audit event (i.e., with a displayed screen); and then associate the information with one or more fields in the displayed screen.

Figure 8:
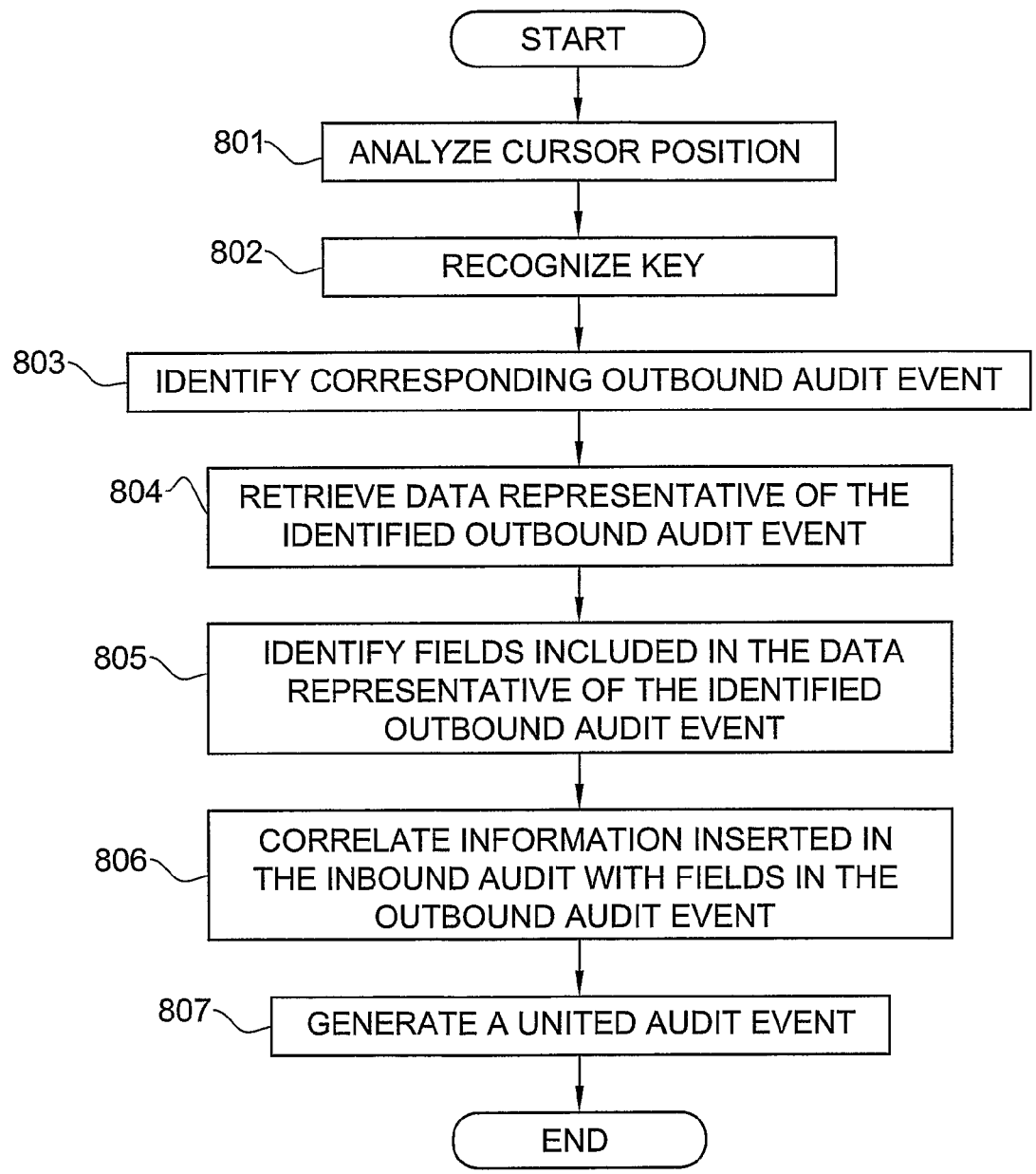
FIG. 8 is a flowchart illustrating in detail association of an outbound audit event with an inbound audit event, according to one embodiment of the invention.

FIG. 8 is a flowchart illustrating in detail association of an inbound audit event with an outbound audit event, according to one embodiment of the invention. It is appreciated that inbound packets that include information, usually provide indication to the cursor position on screen, where information was inserted. Thus, by analyzing or parsing the data representative of the inbound audit event in 801 it is possible to recognize information inserted by the user into fields on screen, the identity of these fields and possibly also the cursor position. See also the explanation provided above, with reference to FIGS. 6A and 6B.

It is also important to recognize the key that the user presses before conveying the information to the host. Sometimes the user can only press one predetermined key, such as "Enter". Nevertheless, in other situations the user can press any one of several optional keys, as the manager who can approve or disapprove the opening of a new account in the new bank account example described above. Thus, recognizing the key in 802 is also valuable. For example, in 802 the Attention Identifiers (AID) pressed by the user are identified, such as Clear, Escape, PF1, PF2 buttons on a keyboard. The analysis can also detect the cursor location while pressing the key.

Returning to the example provided before describing FIGS. 6A and 6B (wherein the first audit event is the login screen, the second event is conveying login information to the host etc.), and remembering that legacy screen protocols are usually incremental (i.e., each packet can change the information representative of the screen created by previous packets) it will be appreciated that many times, when recognizing an identity of an inbound audit event it is possible to identify the corresponding outbound audit event. In the example, knowing that a certain inbound audit event is conveying login information to the host, it can be deduced that the identity of the corresponding outbound audit event was displaying the login screen on a terminal. In addition, it is quite probable that an outbound audit event that corresponds to an inbound audit event is the outbound audit event previous to the inbound audit event in time.

Thus, in 803 the corresponding outbound audit event is identified, and in 804 the data representative of the identified outbound audit event is retrieved. If in FIG. 7, the data representative of the audit event was stored in a disk, for example, then in 804 it is read from the disk. However, this is non-limiting of course and other ways to store the data can be applied, such as storing it in memory, thus in 804 the data in memory is accessed. In addition, a combination is also allowed. For example, in FIG. 7 the data can be stored in a disk or in a database, and in the same time it (or a copy thereof) can be stored also in memory. In this case, in 804 it is possible to access the data in memory, which is usually considered as faster. The procedures described in 803 and 804 together sometimes constitute a single procedure of fetching a corresponding outbound audit event.

In 805 the audit events analyzer identifies the fields (title and/or input fields) included in the corresponding outbound audit event, and in 806 the information inserted in the inbound audit event is correlated with the input fields in the outbound audit event, for example in accordance with the field position.

According to some embodiments, a new audit event is generated in 807, combining data representative of the outbound audit event and data representative of information inserted in the inbound audit event. This newly generated audit events constitutes a united audit event. It is appreciated that it is possible to convey data representative of a united audit event to a terminal emulation program, e.g., for displaying the corresponding screen thereby. Alternatively, instead of generating a new united audit event, it is possible to add data to the data representative of the outbound audit event, such as data representative of the fields and screen.

It should be noted that sometimes the data representative of an inbound audit event includes data that the user did not modify. For example, a clerk can view a client information screen referring to one of the bank clients. If the screen includes information about the client's address and telephone number, the clerk can modify the address and leave the telephone number as it originally appeared on the screen. In this case, if the MDT indicates that the address was modified, in 806 the newly inserted address information (as appears in the data representative of the inbound audit event) replaces the original address information that appeared in the corresponding outbound audit event, while the telephone information is left intact.

The procedure illustrated in the flowchart of FIG. 8 can be adapted for different legacy screen protocols.

It should be noted that the division of the different procedures among the mirror manager 305 and audit events analyzer 307 illustrated in FIGS. 5, 7 and 8 is non-limiting. In different embodiments, the mirror manager 305 and the audit events analyzer 307 can divide the responsibilities between them in a different way. For example, the mirror manager 305 can generate data representative of mirror sessions that include also identification of screens and fields included therein. In the embodiment illustrated in FIG. 8, for example, identification of screens and fields is performed in the audit events analyzer and the data representative of the identification results are included in the data representative of audit events. Combination are also allowed, e.g., wherein the data representative of mirror sessions include data representative of screen and field identification (i.e., outbound audit events) and wherein the data representative of audit events include identification of data representative of information inserted in inbound audit events, etc.

After understanding what audit events are and seeing an example of how audit events can be generated, it is appreciated that when monitoring and auditing a legacy system, it can be beneficial to track business events occurring in the system. For example, one can check how many new bank accounts were opened in the bank during a certain time period, and/or how many accounts were opened by different clerks. In order to do so, an "open bank account" business event is defined, as was previously explained in the example of a clerk in a bank, who opens a new bank account.

Before turning to describe how business events are defined and how data representative of business events are generated, the description returns to the example of the clerk in the bank. Previously, this business event (opening a new bank account) was described as a combination of six audit events between the clerk's terminal and the host (three outbound and three outbound) and two audit events between the manager's terminal and the host (one outbound and one inbound). It should be noted that it is possible to describe this business event also in terms of united business events. Using the united business events terminology it is appreciated that the business event is a combination of three united business events involving the clerk's terminal and the host (the new customer information screen, the financial information screen and the account approved/disapproved screen) and one united audit event involving the manager's terminal and the host (the new account approval screen).

When defining the open new bank account business event, the new customer information outbound audit event is the audit event that initializes the business event. It is referred, therefore, as a "business event start trigger". Further on comes the new customer information inbound audit event, the financial information outbound and inbound audit events, the new account approval outbound and inbound audit events and the account approved/disapproved outbound and inbound audit events. That is, the account approved/disapproved inbound audit event completes the open new bank account business event. This audit event is referred to as a "business event terminator".

However, the clerk (or the customer) can regret in the middle of the process, thus terminating before the bank account is fully opened. In this case, the business event trigger, namely the new customer information outbound event will be intercepted, but only part of the expected audit events will follow. The audit event that will be the last in this partial business event is referred to as a "business event cancel trigger".

It was illustrated in the open bank account example that a business event is composed of a chain of audit events, wherein the chain terminates with one or more business event terminator. In the opening a new bank account example there are two optional business event terminators: the account approved and the account disapproved audit events. In more complicated examples there are also few options for audit events that are in the middle of the chain. For example, if the new customer is a married woman whose husband also has an account in the bank, then instead of opening the previously introduced financial information screen there will open another screen, a "family financial information" screen, where the husband's credit appears too.

Thus, it should be appreciated by those versed in the art that the optional audit events comprising a business event generate together a tree structure, wherein the business event start trigger is the root node and the business event terminators are the leaf nodes. Other nodes in the tree are sometimes referred to as "business event aggregate triggers".

Figure 9:
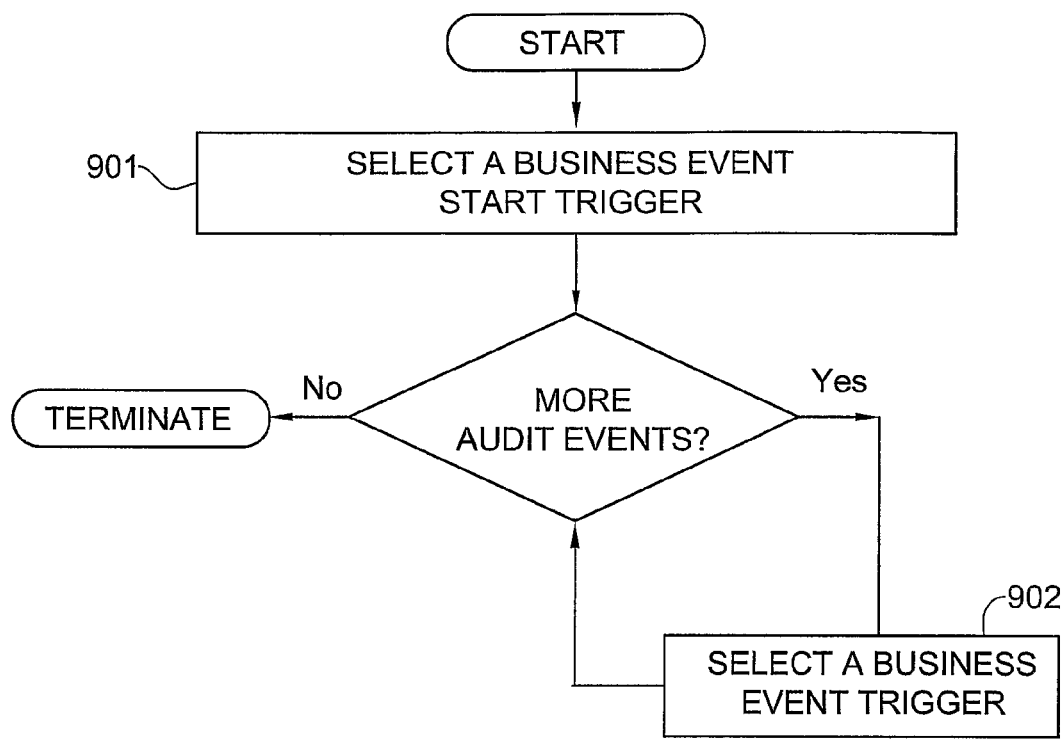
FIG. 9 is a flowchart illustrating how a business event is defined, according to one embodiment of the invention.

FIG. 9 is a flowchart illustrating how a business event is defined, according to one embodiment of the invention. In 901 a business event start trigger is selected, for example, from among a set of available audit events. In 902 additional business events triggers are selected, wherein it is possible to mark whether the trigger is a business event terminator, a business event cancel trigger or a business event aggregate trigger. In addition it is possible to mark what is the trigger that precedes the current trigger in the business event.

Furthermore, when there are parameters being part of a trigger definition, these parameters (and their expected value, if such exists) are provided in 901 and 902.

Furthermore, sometimes triggers include parameters. For example, a new customer information audit event is considered as a business event start trigger only if the customer name types therein is "David Copperfield". In an alternative example the new customer information audit event is considered as a business event start trigger only if its associated user (i.e., the clerk in this case) is "Huckleberry Finn". Furthermore, it is possible to use the cursor position as a parameter, thus, the new customer information audit event is considered as a business event start trigger only if, for example, the cursor position is between the tenth and the eleventh lines on the screen.

Figure 10:
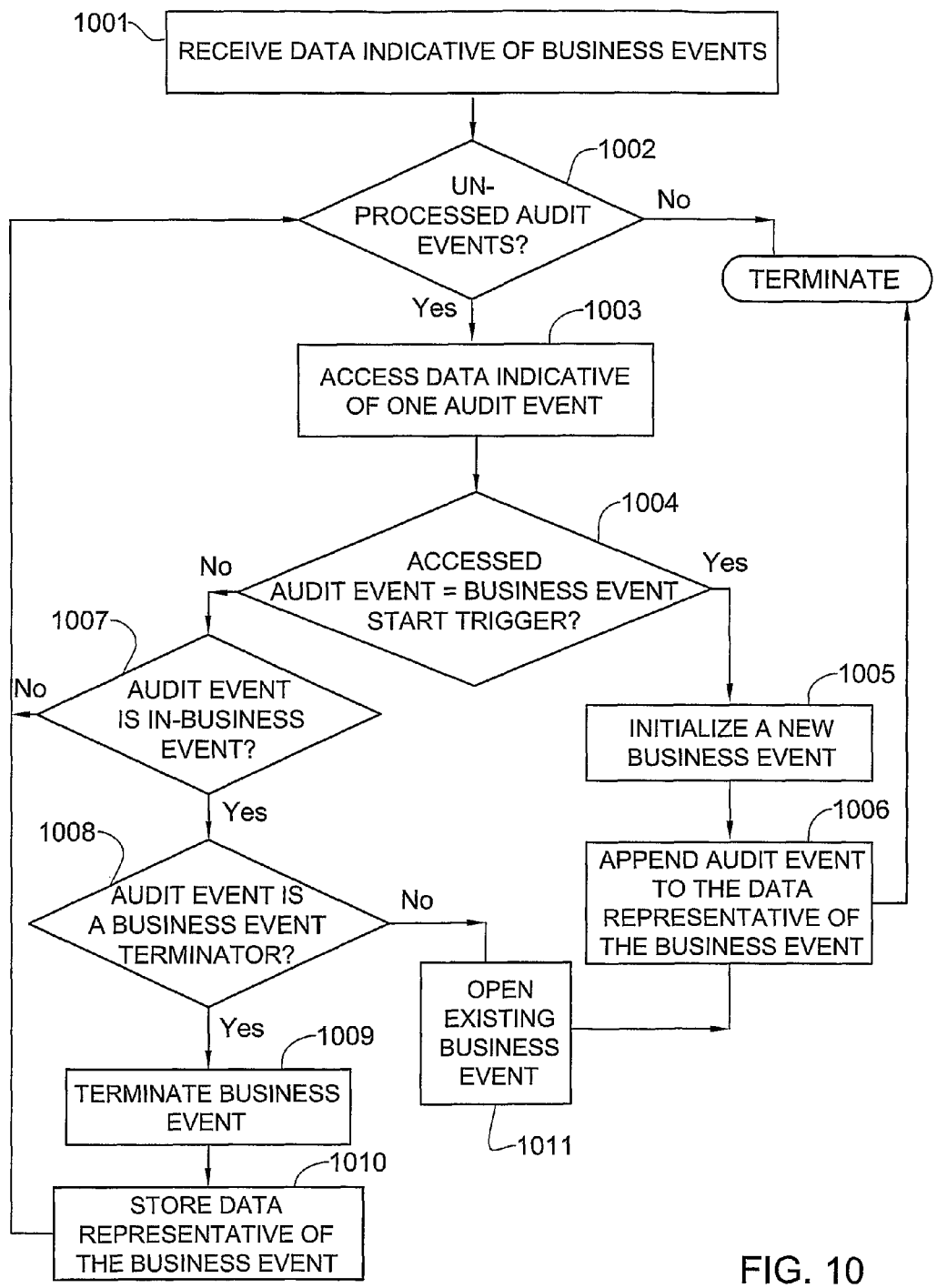
FIG. 10 is a flowchart illustrating in detail generation of data representative of business events, according to one embodiment of the invention.

Turning now to the business events analyzer 309, FIG. 10 is a flowchart illustrating in detail generation of data representative of business events, according to one embodiment of the invention. In 1001 data representative of audit events are received. The data can be bounded by different criteria. For example, it can be bounded by time, starting from one point of time and terminating at a second point of time, wherein the audit events represented by the data are associated with one or more users. In a different example the data representative of the audit events can be associated with only one, predetermined user, etc. The data received in 1001 is representative of one or more audit events.

The data representative of audit events is processed, one event at a time. When in 1002 it is found that there are no more audit events whose representative data is un-processed the process illustrated in FIG. 10 terminates.

In 1003 data representative of one business event is accessed from the data representative of business events. If in 1004 it is found that this one audit event is a business event start trigger, a new business event is initialized in 1005, for example by opening a new file, opening a table in a database or any other applicable way. In 1006 the data representative of the audit event is appended to the data representative of the business event. It is noted though that at this stage the data representative of the business event can be stored in memory or in a long term storage device such as a disk or a database.

However, if in 1004 it is found that the audit event is not a business event start trigger it can be either a business event terminator or a business event cancel trigger or a business event aggregate trigger.

If one or more specific business events are searched for in the data representative of business events, in 1007 the audit event represented by data representative of the audit event are compared with nodes included in these business events' trees, to see if this audit event can be part of any path in these trees. If not, this audit event is not part of a searched business event and therefore the next audit event can be accessed (see 1002 and 1003). If any business event is searched for in the data representative of business events, in 1007 the audit event represented by data representative of the audit event are compared with nodes included in the trees of any business event whose root is the previously detected business event start trigger. If the audit event cannot be part of any path in anyone of these trees, this audit event is not part of a business event and therefore the next audit event can be accessed (see 1002 and 1003).

If in 1007 it is found that the audit event is part of one or more business events in 1008 it is checked if it is a business event terminator or a business event cancel trigger of any of these business events. If so, the business event is terminated in 1009, and in 1010 the data representative of the business event are stored in a storage device (if in 1006 the data representative of the business event is stored in a long term storage device then 1010 is redundant). However, if in 1008 it is found that the audit event is a business event aggregate trigger, in 1011 the business events that the audit event is being part of are opened (or accessed), and in 1006 the data representative of the audit event is appended thereto.

It is noted that an audit event that indicates that the session is terminated serves as a business event cancel trigger for all the open business events in this sessions, i.e., to all the business events in the session that are currently tracked.

Furthermore, when data representative of a business event are stored, it is possible to generate an alert or an alert message (e.g., by sending an email, by raising an alert on a console, by initiating a process in the legacy system or in any other system, or by any other applicable way) indicating that this event has happened. There can be a list (or a repository) of business events that should raise alerts, and their respective severities. Alerts are then raised in accordance with this repository. It is appreciated that the repository and generation of alerts can be located in the alerts manager 312.

Yet further, the alerts manager can generates at least some of the alerts based on predetermined thresholds. For example, if an alert should be generated whenever a certain user tries to login to the system, it is possible to have a threshold for this alert. For example, an alert should be generated only if this certain user tries to login ten times to the system (the threshold is "ten times" in this case).

It is noted that business events monitoring can be used for detecting fraud. For example, clerks in the bank have clearance levels allowing them to access information relating to certain accounts, but not to other account. It is possible to search for those clerks who try to access account to which they have no access rights.

In a different example it is possible to search for business events where clerks try to access accounts using customers' names instead of using account number. Normally information relating to a bank account is accessed by typing the account number on the clerk's terminal. Yet it is possible to search for accounts belonging to a certain customer, then accessing one of his/her accounts. A client who accesses many accounts using customers' names can raise suspicion of fraud. In this case the "search for customer's accounts" can be the business event start trigger.

The invention claimed is:

1. An apparatus configured to monitor and audit activity in a network utilizing an incremental screen protocol, the apparatus comprising:
   a) an analyzer configured to analyze intercepted packets and generate analyzed data based on information associated with at least some of said packets, wherein:
      said packets are conveyed between entities in the network other than the apparatus;
      the analysis comprises identifying whether an intercepted packet is part of an open session or a new session based on a header of the intercepted packet and identifying the incremental screen protocol used in the identified session;
      when the intercepted packet is part of an open session, a session id of the open session is stored as part of the analyzed data along with information included in the intercepted packet and the incremental screen protocol; and
      when the intercepted packet is not part of an open session, a new session id is allocated and the new session id is stored as part of the analyzed data along with the information included in the intercepted packet and the incremental screen protocol;
   b) a mirror manager being incrementally updated based on the analyzed data to reflect mirror data representative of mirror sessions, wherein:
      the mirror data is generated by detecting that the analyzed data is associated with a stored mirror session based on the session id stored as part of the analyzed data;
      the mirror data includes information indicative of a most recent change in an on-screen field location of data responsive to the intercepted packets, the most recent change in the on-screen location determined based on the incremental screen protocol and the information included in the intercepted packets that is stored with the analyzed data;
   c) a data storage unit comprising a non-transitory computer-readable medium accessible thereto for storing the analyzed data, the incremental screen protocol, and the information included in the intercepted packets; and
   d) an audit event analyzer being responsive to said mirror data, said audit event analyzer being configured to generate event data representative of audit events between the other entities in the network, said event data including characteristics relating to the on-screen field location of data being part of the audit events, said on-screen field location being representative of at least one operation performed in the network.

2. A method of monitoring and auditing activity in a network utilizing an incremental screen protocol, the method comprising:
   a) analyzing from a first entity intercepted packets, wherein:
      said packets are conveyed between entities in the network other than the first entity; and
      the analysis comprises identifying whether an intercepted packet is part of an open session or new session based on a header of the intercepted packet and identifying the incremental screen protocol used in the identified session;
   b) generating analyzed data based on information associated with at least some of said packets, wherein:
      when the intercepted packet is part of an open session, a session id of the open session is stored as part of the analyzed data along with information included in the intercepted packet and the incremental screen protocol; and
      when the intercepted packet is not part of an open session, a new session id is allocated and the new session id is stored as part of the analyzed data along with the information included in the intercepted packet and the incremental screen protocol;
   c) incrementally updating mirror data representative of mirror sessions based on the analyzed data, wherein:

the mirror data is generated by detecting that the analyzed data is associated with a stored mirror session based on the session id stored as part of the analyzed data; and the mirror data includes information indicative of a most recent change in an on-screen field location of data responsive to the intercepted packets, the most recent change in the on-screen location determined based on the incremental screen protocol and the information included in the intercepted packets that is stored with the analyzed data;

d) storing the analyzed data, the incremental screen protocol, and the information included in the intercepted packets; and e) generating event data representative of audit events between the other entities in the network, said event data including characteristics relating to the on-screen field location of generating event data representative of audit events between the other entities in the network, said event data including characteristics relating to the on-screen field location of data being part of audit events, said on-screen field location being representative of at least one operation performed in the network.

3. The method of claim 2 further comprising storing at least part of the mirror data representative of mirror sessions.

4. The method of claim 2 further comprising compressing at least part of the mirror data representative of mirror sessions.

5. The method of claim 2 further comprising encrypting at least part of the mirror data representative of mirror sessions.

6. The method of claim 2 further comprising digitally signing at least part of the mirror data representative of mirror sessions.

7. A computer program product comprising a non-transitory computer medium having computer readable program code embodied therein for monitoring and auditing activity in a network utilizing an incremental screen protocol, when executed by a processor, to perform operations comprising:

a) analyzing from a first entity intercepted packets, wherein:

said packets are conveyed between entities in the network other than the first entity; and the analysis comprises identifying whether an intercepted packet is part of an open session or a new session based on a header of the intercepted packet and identifying the incremental screen protocol used in the identified session;

b) generating analyzed data based on information associated with at least some of said packets, wherein:

when the intercepted packet is part of an open session, a session id of the open session is stored as part of the analyzed data along with information included in the intercepted packet and the incremental screen protocol; and when the intercepted packet is not part of an open session, a new session id is allocated and the new session id is stored as part of the analyzed data along with the information included in the intercepted packet and the incremental screen protocol;

c) incrementally updating mirror data representative of mirror sessions based on the analyzed data, wherein:

the mirror data is generated by detecting that the analyzed data is associated with a stored mirror session based on the session id stored as part of the analyzed data; and the mirror data includes information indicative of a most recent change in an on-screen field location of data responsive to the intercepted packets, the most recent change in the on-screen location determined based on the incremental screen protocol and the information included in the intercepted packets that is stored with the analyzed data;

d) storing the analyzed data, the incremental screen protocol, and the information included in the intercepted packets; and e) generating event data representative of audit events between the other entities in the network, said event data including characteristics relating to the on-screen field location of data being part of audit events, said on-screen field location being representative of at least one operation performed in the network.

* * * * *